United States Patent
Harnefors

(10) Patent No.: US 8,330,398 B2
(45) Date of Patent: Dec. 11, 2012

(54) METHOD AND SYSTEM TO START MULTIPLE AC MOTORS SUPPLIED BY A POWER CONVERTER VIA A COMMON AC BUS

(75) Inventor: Lennart Harnefors, Eskilstuna (SE)

(73) Assignee: ABB Technology AG, Zürich (CH)

(*) Notice: Subject to any disclaimer, the term of this patent is extended or adjusted under 35 U.S.C. 154(b) by 489 days.

(21) Appl. No.: 12/531,104

(22) PCT Filed: Mar. 14, 2007

(86) PCT No.: PCT/EP2007/052395
§ 371 (c)(1),
(2), (4) Date: Mar. 15, 2010

(87) PCT Pub. No.: WO2008/110209
PCT Pub. Date: Sep. 18, 2008

(65) Prior Publication Data
US 2010/0164412 A1     Jul. 1, 2010

(51) Int. Cl.
*H02J 3/18* (2006.01)
*H02P 1/58* (2006.01)

(52) U.S. Cl. ............ 318/101; 318/34; 318/47; 307/29; 307/31

(58) Field of Classification Search .......... 318/700, 318/101–103, 111–113, 34, 47, 49, 51, 53, 318/78, 727, 778; 307/29, 31, 34, 36, 37
See application file for complete search history.

(56) References Cited

U.S. PATENT DOCUMENTS

| | | | | |
|---|---|---|---|---|
| 3,686,551 A | * | 8/1972 | Peterson | 318/717 |
| 4,064,419 A | | 12/1977 | Peterson | |
| 4,684,875 A | * | 8/1987 | Powell | 323/204 |
| 6,737,827 B2 | * | 5/2004 | Cashatt | 318/727 |
| 6,954,046 B2 | * | 10/2005 | Cashatt | 318/432 |
| 6,975,946 B2 | * | 12/2005 | Al-Hamrani | 702/60 |
| 7,378,821 B2 | * | 5/2008 | Simpson, III | 323/205 |
| 7,638,966 B1 | * | 12/2009 | Pummer | 318/729 |
| 7,855,526 B2 | * | 12/2010 | Ohnishi et al. | 318/800 |

(Continued)

FOREIGN PATENT DOCUMENTS

CH     402165 A     11/1965

(Continued)

OTHER PUBLICATIONS

PCT/ISA/210—International Search Report—Dec. 13, 2007.

(Continued)

*Primary Examiner* — Eduardo Colon
(74) *Attorney, Agent, or Firm* — Venable LLP; Eric J. Franklin

(57) ABSTRACT

A method to start at least two AC motors that are supplied from a common AC bus, which in turn is supplied from a power converter. At least one of the AC motors is an electrically excited synchronous motor including an excitation circuit. The synchronous motor is started first. During starting of remaining of the at least two AC motors a reactive power supplied by the power converter is determined and an increase of a field current or of a field voltage of the synchronous motor in linear dependence on the reactive power supplied by the power converter is determined. The increased field current or field voltage is applied to the excitation circuit of the synchronous motor.

9 Claims, 3 Drawing Sheets

U.S. PATENT DOCUMENTS

2003/0178960 A1 * 9/2003 Kassing .................. 318/430
2012/0181862 A1 * 7/2012 Gertmar et al. ............. 307/22

FOREIGN PATENT DOCUMENTS

| EP | 0194400 | A  | 9/1986  |
| EP | 0982828 | A2 | 3/2000  |
| GB | 1174025 | A  | 12/1969 |

OTHER PUBLICATIONS

PCT/ISA/237—Written Opinion of the International Searching Authority—Dec. 13, 2007.

* cited by examiner

METHOD AND SYSTEM TO START MULTIPLE AC MOTORS SUPPLIED BY A POWER CONVERTER VIA A COMMON AC BUS

CROSS-REFERENCE TO RELATED APPLICATIONS

This application is the national phase under 35 U.S.C. §371 of PCT/EP2007/052395 filed 14 Mar. 2007.

FIELD OF THE INVENTION

The invention relates to a method and a system to start at least two AC motors which are supplied by a power converter via a common AC bus.

BACKGROUND OF THE INVENTION

When AC motors such as synchronous and induction motors are started, a large current is drawn. This starting current is typically five times larger than the rated current of the motors. If several motors are supplied from a common AC bus, which in turn is supplied from a power converter, the converter's current capability must at least be as big as the sum of the rated currents of all motors which are already running plus the starting current of the motor which is started last. This current capability value assumes that the motors are only started one after the other and not multiple of them at the same time. If more than one AC motors are started simultaneously then the current capability of the converter must of course be even higher.

A common AC bus for several AC motors is for example known from offshore platforms producing oil or gas. Such platforms are equipped with huge compressors and pumps which require supply voltages of several kilovolts. More and more of offshore platforms receive their electrical power supply from shore instead of producing it directly on the platform by using gas turbines or diesel generators. The power from shore is usually supplied by a high voltage direct current (HVDC) transmission system, where alternating voltage is transformed by an onshore power converter into direct voltage, transferred via a subsea DC cable to the platform and transformed into alternating voltage by an offshore power converter. The alternating voltage output from the offshore power converter is supplied to an AC bus, i.e. an AC line with one or more phases. The driving units of compressors and pumps on the platform, i.e. synchronous and induction motors, are connected directly to the AC bus without power transformation or conversion in-between. If these motors are started, the current on the AC bus should not exceed the current capability of the offshore power converter.

In order to be on the safe side it is one possibility to provide a power converter with increased current capability. However, such overrating is undesirable due to higher cost and bulkier and heavier equipment. The aspect of weight plays especially an important role when designing an offshore platform.

A known solution to reduce the starting current of larger three-phase AC motors is the so called wye-start-delta-run method, where the motor windings are wye connected during the start and delta connected afterwards. The wye connection applies a reduced voltage compared to the delta connection. The level of the voltage is always reduced by the same factor (1.732) compared to the line voltage. This means that no correction is possible if the voltage is too small to produce the necessary starting torque for the motor. Apart from that, additional switching means are required and switching currents occur during the change from wye to delta connection.

Another solution which is applied in case of induction motors is the installation of extra devices such as starting capacitors. This would again increase the costs.

SUMMARY OF THE INVENTION

It is an object of the present invention to provide a method and a system with which at least two AC motors supplied by a power converter via a common AC bus can be started at reduced starting current.

The object is achieved by a method and a system.

The invention is based on the recognition of the fact that the current produced during starting of the AC motors is mainly reactive current. Accordingly, the invention is based on the general idea to compensate for the reactive power in the system during the starting process.

The proposed solution requires that at least one of the AC motors is an electrically excited synchronous motor, since it was realized the field excitation circuit of the motor provides the possibility to influence the reactive power production or consumption at the voltage supply terminals of the motor.

In case of voltage generation by a synchronous generator it is known in the art to control the voltage of the field winding of the generator to keep the generator's terminal voltage constant. By varying the excitation, i.e. the field current, the generator is forced to produce or consume the proper amount of reactive power to maintain the terminal voltage.

According to the invention, this control possibility of reactive power production and consumption is now applied to a synchronous motor instead of a generator. Therefore, at least one of the AC motors on the common AC bus needs to be a synchronous motor. The at least one synchronous motor is started first. Then the reactive power of the power converter is determined. From the reactive power an increase of the field current or of the field voltage of the synchronous motor is determined, where the increase is calculated in linear dependence on the reactive power. The increased field current or field voltage is applied then to the excitation circuit of the synchronous motor. In the system according to the invention, the method is performed by a first control unit which controls the excitation circuit of the at least one synchronous motor. The control of the field excitation of the at least one synchronous motor in dependence on the reactive power of the power converter ensures that an increase in the reactive power supplied from the converter is compensated directly by an increase of the excitation of the synchronous motor thereby producing more reactive power by the motor. Thereby, the reactive current to start the other AC motors is supplied partly by the synchronous motor, which allows the current rating of the converter to be reduced. This in turn saves weight, installation space and costs.

In case that more than one synchronous motor is connected to the common AC bus, either only one of them or a multiple or all of them are used for the reactive power production and consumption. In each case it is essential that the power rating of the one or the multiple synchronous motors is sufficient to provide enough reactive power for all of the AC motors connected to the common AC bus.

The AC motors connected to the common bus can be single-phase motors or multiple-phase motors. Preferably they are three-phase motors.

In a preferred embodiment of the invention the output current of the power converter is determined and the output voltage of the power converter is reduced when the output current reaches a first predetermined level. This additional control function is preferably performed by a second control unit which controls the output of the power converter. But of course it is also possible to integrate the function of the first and the second control units into one control unit. The control of the output voltage of the power converter in dependence on its output introduces a current limitation to the power converter, thereby ensuring the starting of the AC motors without excessive current draw. This gives the extra protection that the current limit of the power converter is not exceeded.

Alternatively or in addition to the reduction of the output voltage, the output frequency of the power converter may be reduced when the output current of the power converter reaches a second predetermined level. Depending on the electrical characteristics of the power converter, the first and the second predetermined current levels can be chosen to have the same value.

In a special embodiment, the method to control the excitation of the synchronous motor is only applied during the starting process of the remaining of the at least two AC motors, i.e. during normal operation mode of the AC motors no extra reactive power is produced by the synchronous motor. The beginning and/or the end of the starting process can be communicated to the first control unit by a special signal.

BRIEF DESCRIPTION OF THE DRAWINGS

The invention is now described by way of example with reference to the accompanying drawings in which.

DETAILED DESCRIPTION OF EMBODIMENTS OF THE INVENTION

Figure 1:
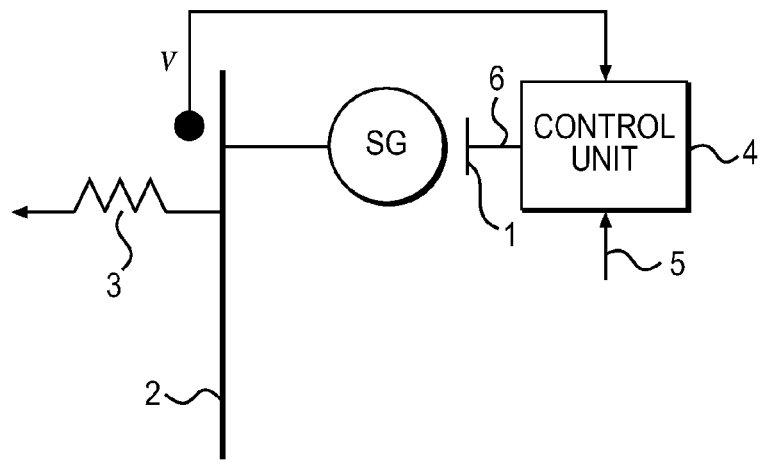
FIG. 1 shows a schematic diagram of the control of the output voltage of a synchronous generator known in the art.

FIG. 1 shows a synchronous generator SG the excitation circuit 1 of which is connected to a control unit 4. The synchronous generator SG provides an AC voltage v to an AC bus 2 in order to supply power to a load 3. The control unit 4 receives a supply voltage 5, which the control unit 4 adjusts and then applies as magnetizing or field voltage 6 to the excitation circuit 1. The adjustment of the field voltage 6 is determined by the first control unit 4 so that the AC bus voltage v is maintained at a constant level.

Figure 2:
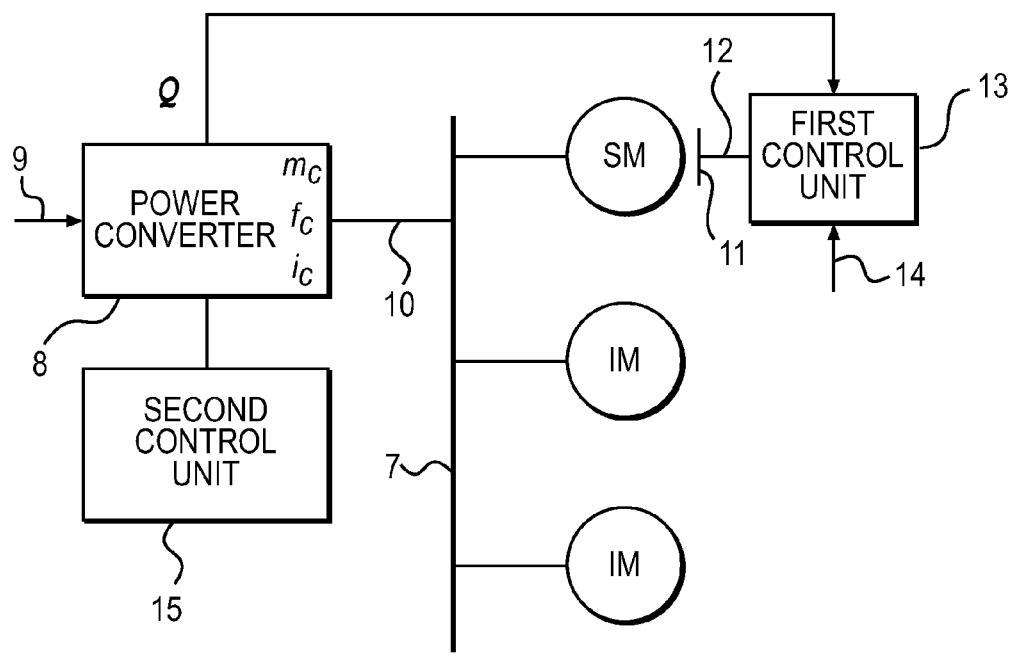
FIG. 2 shows a schematic diagram of a system with three AC motors on a common AC bus, supplied by a power converter.

In FIG. 2, a schematic diagram is shown of a synchronous motor SM and of two induction motors IM which are all connected to the same common AC bus 7. The AC bus 7 is supplied with voltage from a power converter 8, where the power converter 8 transforms a DC voltage 9 into an AC voltage 10. The synchronous motor SM has an excitation circuit 11 which is controlled by a first control unit 13. The first control unit 13 receives again a supply voltage 14. The supply voltage 14 is adjusted by the first control unit 13 and then applied as field voltage 12 to the excitation circuit 11.

In this example it is supposed that the three AC motors each draw the same amount of current during start as well as rated current during normal operation. It is assumed that the start current is 5 per unit (pu) of the rated current. The rated current is accordingly 1 pu. Once all motors are started, 3 pu current is thus drawn. It is further assumed that the three AC motors are started one after the other. During starting of the last motor, a current of 2 pu from the already running motors plus 5 pu of the starting motor is drawn. Hence, the power converter 8 would be needed to have a current capability of 7 pu current.

FIG. 2 shows how the invention is applied. The reactive power Q of the power converter 8 is determined from voltage and/or current measurements, and this reactive power Q is communicated to the first control unit 13. The communication can be performed by any suitable communication means such as wireless technology or cable or optic fibre. From the reactive power Q, the first control unit 13 determines an increased field voltage $v_f$ according to the relation $v_f = v_{f0} + k \cdot Q$, where k is a positive constant.

Alternatively, the field current $i_f$ may be determined according to $i_f = i_{f0} + m \cdot Q$, where m is a positive constant, and the resulting field voltage $v_f$ is then determined from the field current $i_f$ and the known electrical parameters of the field excitation circuit 11. The base values of the field voltage $v_{f0}$ and field current $i_{f0}$ represent the field excitation which would be applied under normal control conditions of the synchronous motor SM, if no additional reactive power needs to be produced. The larger the constants k and m are chosen, the quicker the synchronous motor SM reacts with the production of reactive power to an increase in the reactive power of the power converter 8.

During starting of the three AC motors the following currents are now drawn. When the synchronous motor SM is started, which should always be started first, 5 pu current is drawn. However, when the next motor IM is started, the synchronous motor SM supplies the reactive power needed, so that only 2 pu current is drawn, ideally. But even if the synchronous motor SM produces not all the reactive power needed to provide the reactive starting current to the second motor IM, considerably less than the usual 6 pu current (1 pu plus 5 pu) would be drawn. If the third motor IM is started, ideally only 3 pu current need to be provided by the power converter 8. In this example it is assumed that the synchronous motor SM is able to produce the whole amount of necessary reactive power to start the other two AC motors IM. Accordingly, the power converter 8 was reduced to a current capability of 5 pu current, i.e. the amount of current which is drawn by the synchronous motor SM started first.

In order to ensure that the current of the power converter 8 does not exceed a predetermined limit, a second control unit 15 controls the output voltage ($u_c$) and output frequency ($f_c$) in such a way, that both quantities are reduced when the output current ($i_c$) of the power converter 8, i.e. the current in the AC bus 7, exceeds a predetermined limit ($i_{lim}$). In this example the predetermined limit is chosen as 5 pu current so that the power converter does never exceed its current capability.

Figure 3:
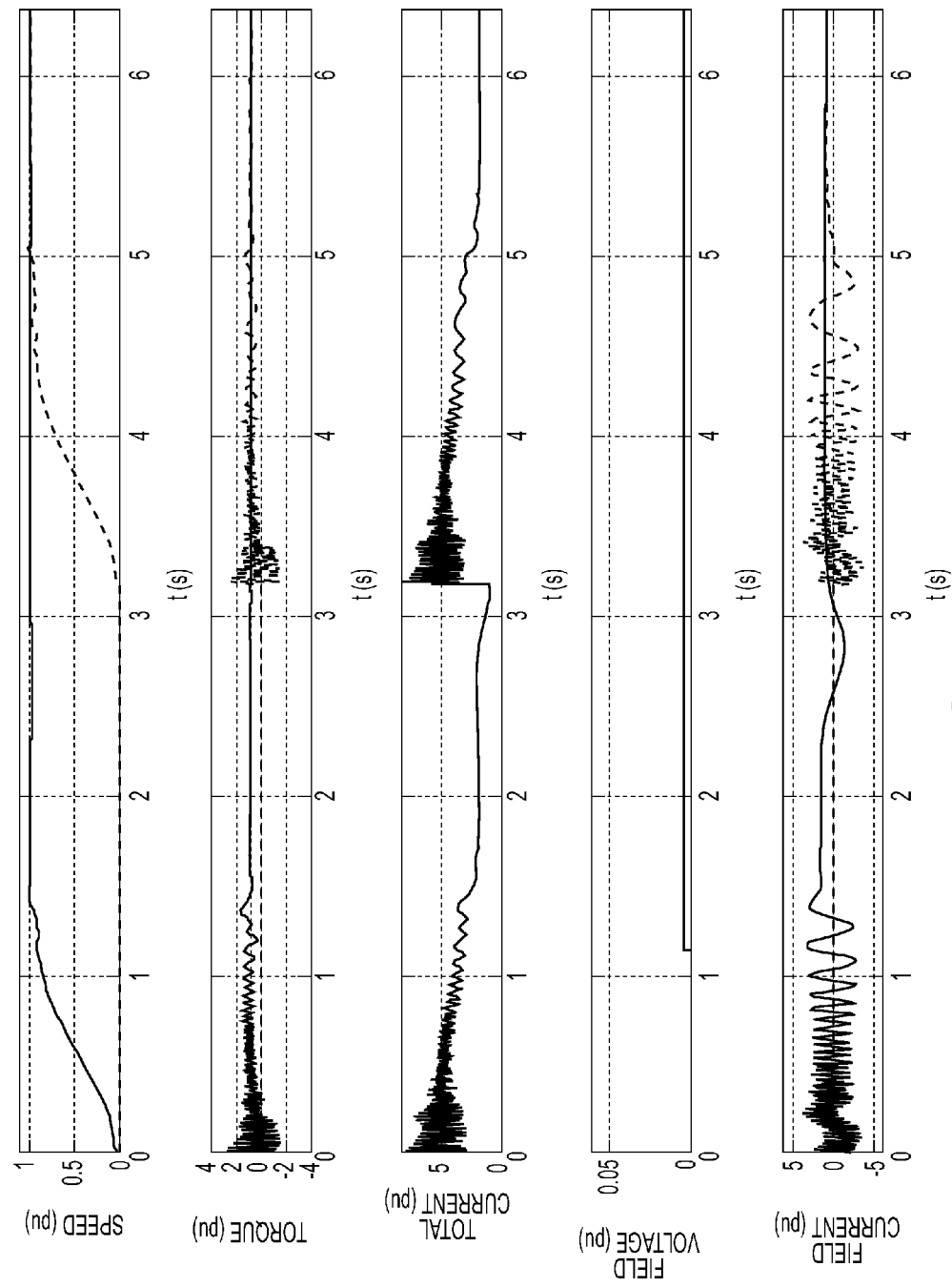
FIG. 3 shows results of a simulation of two equally large synchronous motors started in sequence without reactive power control.

In FIG. 3, simulation results are shown of a sequential starting of two equally large synchronous motors connected to the same AC bus, where the AC bus is supplied from a power converter. The first motor is started at zero seconds while the second motor is started after 3.2 seconds, as can be seen from the motor speeds. After the starting, under normal working conditions, each of the motors draws a current of 1 pu. During starting each of the motors draws a current of averaged 5 pu and about 7 pu maximum. Accordingly, when the second motor is started, the total current drawn by the two motors together approaches 8 pu.

Figure 4:
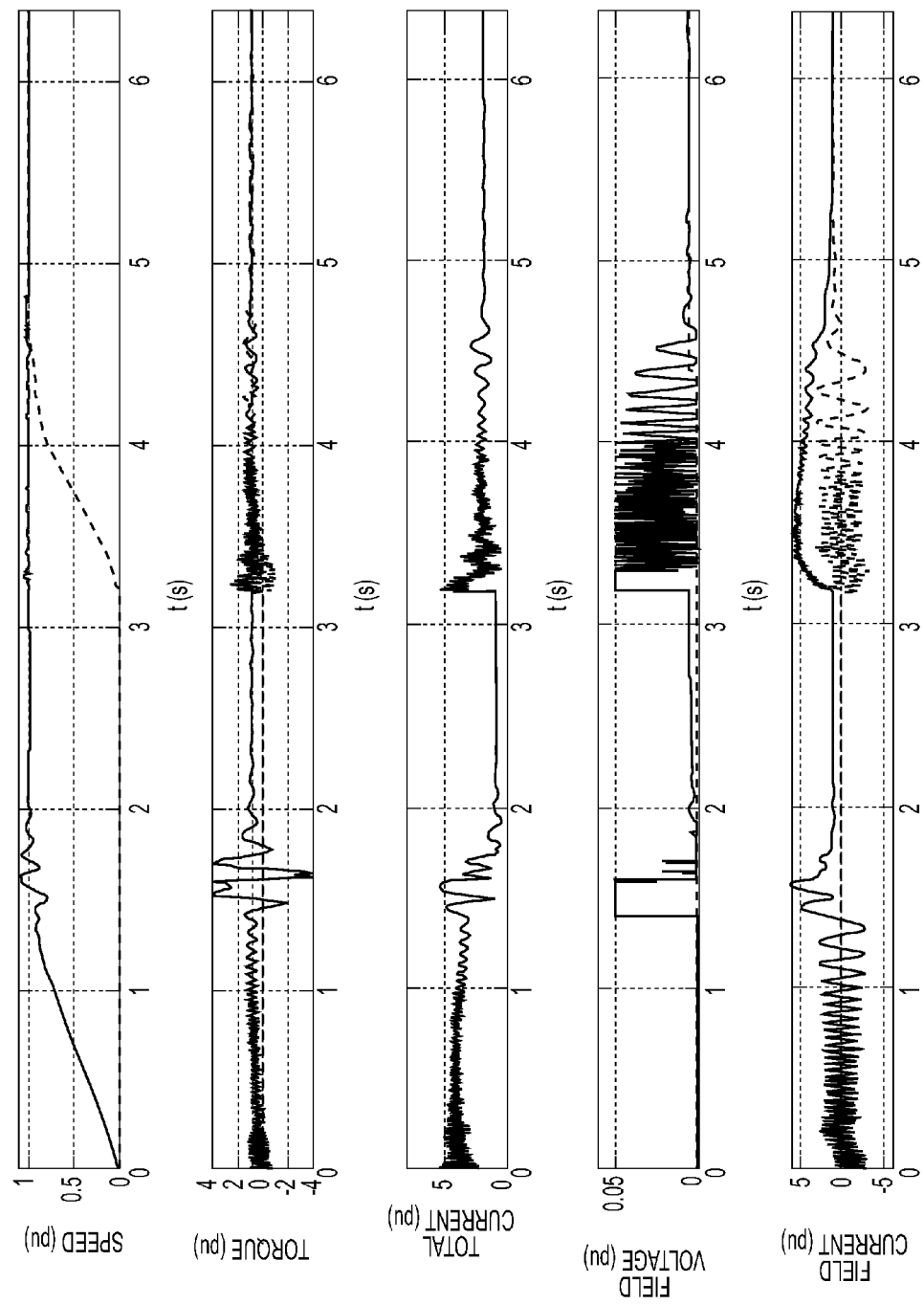
FIG. 4 shows results of a simulation of two equally large synchronous motors started in sequence with reactive power control.

FIG. 4 illustrates the sequential starting of the same two synchronous motors, but with the adjustment of the field voltage of the synchronous motor started first according to the reactive power of the power converter. The power converter is assumed to have a current capability of 5 pu current. As can be seen from FIG. 4, the field voltage of the synchronous motor started first is adjusted, so that during the starting of the second motor the total current is only 2 pu in the average, and the absolute limit of 5 pu is never exceeded.

The invention claimed is:

1. A method to start at least two AC motors which are supplied from a common AC bus, which in turn is supplied from a power converter, wherein at least one of the AC motors is an electrically excited synchronous motor comprising an excitation circuit, the method comprising:
   starting first the synchronous motor,
   during starting of remaining of the at least two AC motors
      determining a reactive power supplied by the power converter,
      determining an increase of a field current or of a field voltage of the synchronous motor in linear dependence on the reactive power supplied by the power converter, and
      applying the increased field current or field voltage to the excitation circuit of the synchronous motor.

2. The method according to claim 1, further comprising:
   determining an output current of the power converter and reducing an output voltage of the power converter when the output current reaches a first predetermined limit.

3. The method according to claim 2, further comprising:
   reducing an output frequency of the power converter when the output current reaches a second predetermined limit.

4. The method according to claim 1, where the method is only applied during starting of remaining at least two AC motors.

5. A system, comprising:
   at least two AC motors, wherein at least one of the motors is an electrically excited synchronous motor comprising an excitation circuit,
   a common AC bus to supply the at least two AC motors,
   a power converter to supply the common AC bus, and
   a first control unit to control the excitation circuit, wherein the first control unit
   starts the first synchronous motor, and
   determines the reactive power (Q) of the power converter
   during starting of remaining of the at least two AC motors
      determines an increase of a field current or of a field voltage of the synchronous motor in linear dependence on the reactive power supplies by the power converter, and
      applies the increased field current or field voltage to the excitation circuit of the synchronous motor.

6. The system according to claim 5, further comprising:
   a second control unit to control an output of the power converter, wherein the second control unit determines an output current of the power converter and reduces an output voltage of the power converter when the output current reaches a first predetermined limit.

7. The system according to claim 6, wherein the second control unit reduces an output frequency of the power converter when the output current reaches a second predetermined limit.

8. The system according to claim 5, wherein the at least two AC motors are three-phase AC motors.

9. The system according to claim 5, wherein the system comprises a part of an offshore installation.

* * * * *